United States Patent
Blades et al.

(10) Patent No.: US 6,493,811 B1
(45) Date of Patent: Dec. 10, 2002

(54) INTELLIGENT CONTROLLER ACCESSED THROUGH ADDRESSABLE VIRTUAL SPACE

(75) Inventors: Jerry A. Blades, Broomfield, CO (US); Matthew C. Dewey, Broomfield, CO (US); Bruce A. Thompson, Golden, CO (US); David J. Van Maren, Fort Collins, CO (US); James M. Wilson, Superior, CO (US)

(73) Assignee: Computer Associated Think, Inc., Islandia, NY (US)

( * ) Notice: Subject to any disclaimer, the term of this patent is extended or adjusted under 35 U.S.C. 154(b) by 0 days.

(21) Appl. No.: 09/233,979

(22) Filed: Jan. 20, 1999

Related U.S. Application Data

(60) Provisional application No. 60/072,582, filed on Jan. 26, 1998.

(51) Int. Cl.[7] .............................................. G06F 12/00
(52) U.S. Cl. ....................... 711/203; 711/202; 711/147; 711/148; 711/6; 711/111; 711/112
(58) Field of Search .................... 711/147–148, 118, 711/203, 111–112, 114, 6; 707/10, 101; 710/52

(56) References Cited

U.S. PATENT DOCUMENTS

| | | | |
|---|---|---|---|
| 4,918,588 A | * 4/1990 | Barrett et al. ................. | 707/10 |
| 5,001,628 A | * 3/1991 | Johnson et al. ............... | 707/10 |
| 5,077,737 A | * 12/1991 | Leger et al. .................... | 714/6 |
| 5,126,739 A | * 6/1992 | Whiting et al. .............. | 341/106 |
| 5,218,685 A | * 6/1993 | Jones ........................... | 711/160 |
| 5,262,875 A | * 11/1993 | Mincer et al. ............... | 386/101 |
| 5,357,614 A | * 10/1994 | Pattisam et al. .............. | 710/68 |
| 5,463,772 A | * 10/1995 | Thompson et al. ......... | 707/101 |

* cited by examiner

Primary Examiner—Than Nguyen
(74) Attorney, Agent, or Firm—Cooper & Dunham LLP

(57) ABSTRACT

File operations on files in a peripheral system are controlled by an intelligent controller with a file processor. The files are accessed as if the intelligent controller were an addressable virtual storage space. This is accomplished first by communicating controller commands for the intelligent controller through read/write commands addressed to a Command Region of a virtual storage device. The controller commands set up a Mapped Data Region in the virtual storage device for use in controlling data transfer operations to and from the peripheral system. With the Mapped Data Regions set up, blocks of data are transferred between the host and the intelligent controller in response to read/write commands addressed to the Mapped Data Region of the virtual storage device.

In an additional feature of the invention file operations are communicated between host and controller through a device driver at the host and a device emulator at the intelligent controller. If the address in the device write/read command is pointing to the Command Region of the virtual storage device, a Command Region process interprets and implements the controller operation required by the controller command embedded in the device write/read command. One of these controller commands causes the Command Region processor to map a requested file to a Mapped Data Region in the virtual storage device. If the address detected by the detecting operation is in a Mapped Data Region, a Mapped Data Region process is called. The Mapped Data Region process reads or writes requested data of a file mapped to the Mapped Data Region addressed by the read/write command. This mapped file read or write is accomplished as a transfer of data over a data path separate from a control path. In an additional feature of the invention, the data transfer between host system and intelligent controller is accomplished by performing a direct memory access transfer of data.

35 Claims, 12 Drawing Sheets

INTELLIGENT CONTROLLER ACCESSED THROUGH ADDRESSABLE VIRTUAL SPACE

This application claims the benefit of provisional application Ser. No. 60/072,582 filed Jan. 26, 1998, the contents of which are herein incorporated by reference.

BACKGROUND OF THE INVENTION

1. Field of the Invention

This invention relates to an intelligent controller having a control path and a data path to the controller separately accessed through addressable virtual space. The invention also relates to a computer peripheral system architecture and a control system protocol capable of communicating commands, messages, control information and data between a peripheral system and one or more host computers in a manner independent of the type of peripheral devices and the type of host computers.

2. Description of the Related Art

Computing systems having a peripheral system.connected to the host through a controller are of course well known. Particularly, computing systems having a large mass storage system connected as a part of a virtual file system are known. Such a system has been implemented with a computing system having a peripheral system adapter in a virtual file system connected through a SCSI (Small Computing System Interface) bus to a peripheral file system containing the mass storage system. The peripheral system adapter provides the interface between the virtual file system and the host and the peripheral file system. The host system is a UNIX system. As is well known, the virtual file system protocol, along with entities in the virtual file system being identified as "vnodes," allows the virtual file system to incorporate multiple types of file systems into a virtual file system that appears to the host as a single system.

The system calls at the host are converted to vnode file commands at the virtual file system. The vnode file commands, along with embedded data in each command, are passed to the peripheral file system. The peripheral file system converts the vnode file commands to driver commands, and executes the commands to handle the data passed with the vnode file commands.

The problem with communicating with the peripheral file system through vnode file commands with embedded data is that the communication is quite limited compared to the capability of the peripheral file system. File systems are designed to optimize data transfer operations as in DMA (Direct Memory Access) operations. By communicating vnode commands with embedded data between the peripheral file system and the host, the embedded data is neither block-aligned nor page-aligned. Aligning this data to appropriate boundaries, so that it is useable, requires an extra copy step. Also, by communicating the data embedded in the vnode commands, the handling of the data requires all the overhead associated with processing commands. This is in stark contrast to DMA operations where data with proper page blocks is transferred directly between memory and disk drive.

What is needed is a mass storage system controller and a communication protocol between the virtual file system at the host and the storage system controller so that commands from the host to the controller are standard commands, and data can be presented back to the host in a proper form to be passed in a DMA operation.

SUMMARY OF THE INVENTION

Partial Summary of Features

In accordance with this invention, the above problems have been solved by providing access to data in a peripheral system controlled by an intelligent controller, and this access is provided as if the intelligent controller were an addressable virtual storage space. This is accomplished first by communicating controller commands for the intelligent controller through read/write commands addressed to a Command Region of a virtual storage device.

The controller commands set up a Mapped Data Region in the virtual storage device for use in data transfer operations to and from the peripheral system. With the Mapped Data Regions set up, blocks of data are transferred between the host and the intelligent controller through read/write commands addressed to the Mapped Data Region of the virtual storage device.

In an additional feature of the invention, file operations are communicated between host and controller through a device driver at the host and a device emulator at the intelligent controller. If the address in the device write/read command is pointing to the Command Region of the virtual storage device, a Command Region process interprets and implements the controller operation required by the controller command embedded in the device write/read command. One of these controller commands causes the Command Region process to map a requested file or file portion to a Mapped Data Region in the virtual storage device. If the address detected in the device write/read command is in a Mapped Data Region, a Mapped Data Region process is called. The Mapped Data Region process reads or writes a requested file or file portion mapped to the Mapped Data Region addressed by the read/write command. This mapped file read or write is accomplished as a transfer of data separate from the transfer of commands.

In an additional feature of the invention, the data transfer between host system and intelligent controller is accomplished by performing a direct memory access transfer of data.

Utility and Advantages

This invention provides a new architecture to allow multiple computers with different operating systems to share data and storage at storage speeds. Many of the limitations of today's storage devices can be eliminated with this new architecture. Further, this architecture is able to integrate new ideas and functionality without disruption of the existing behavior or causing significant impact to the operating system itself When multiple host computers attempt to access the storage system, all unused storage space is available to any host connected. The storage space is not prepartitioned among hosts. Hosts are allocated storage as needed. If one host needs the storage, it can use any or all of the available space. If a host deletes a file, that space is available to any other host. This dynamic storage sharing operates automatically and transparently. Also, it does not matter what type of host is connected to the storage system controller so multiple types of hosts may be connected to the same intelligent controller.

Data can be shared by multiple hosts, and this data sharing is at the storage level. Two hosts connected to the same storage can copy, move, or access each other's data at the storage level. Each host has access to any file written by any host. When one user writes a file, that file is available to any other user on any other host, given the correct permissions. All this is done without burdening any other computer or any network connecting the host computers.

This invention provides an intelligent controller capable of dynamic storage sharing and true data sharing to block level devices. The advantages of such a combined system are enormous. Any server, no matter what operating system it is running, can access and modify files written by any other server, no matter its operating system, directly at storage interface speeds. No copy need be involved. Any server can use any available storage. No longer are administrators required to unload data from a RAID device, reconfigure the partitions to add more storage to a full partition, and then reload the data, all while the data is inaccessible by users.

Storage Area Networks (SAN) will benefit most from the architecture of this invention. Dissimilar servers can be connected to the SAN and share data and storage. Storage can be added to the network independent of the hosts. Any existing addressable storage can remain on the same interconnect, albeit with the same limitations.

The invention is storage technology independent. Storage technology vendors can develop and support storage devices with vastly different characteristics with the same host integration. RAID, optical DVD towers, jukeboxes, etc., can all have the same interface to the host computer. This means storage vendors can release technology independent of operating system schedules to get solutions to their customers sooner.

The invention allows capacity to be added seamlessly without the need to bring the system down for a long reconfiguration process. Existing data does not need to be offloaded then reloaded when the capacity is added. . After new space is added, it is available to any host. Any file can become larger and any directory can hold more files.

Other features, utilities and advantages of the invention will be understood by those of ordinary skill in the art after referring to the complete written description of the preferred embodiments of the invention in conjunction with the following drawings.

DESCRIPTION OF THE PREFERRED EMBODIMENTS OF THE INVENTION

The embodiments of the invention described herein are implemented as logical operations in an intelligent controller for operating with one or more host computing systems. The logical operations of the present invention are implemented (1) as a sequence of computer-implemented steps running on a computer processor in the intelligent controller, and (2) as interconnected machine modules within the intelligent controller. The implementation is a matter of choice, dependent on the performance requirements of the intelligent controller implementing the invention. Accordingly, the logical operations making up the embodiments of the invention described herein are referred to variously as operations, steps or modules.

Figure 1:
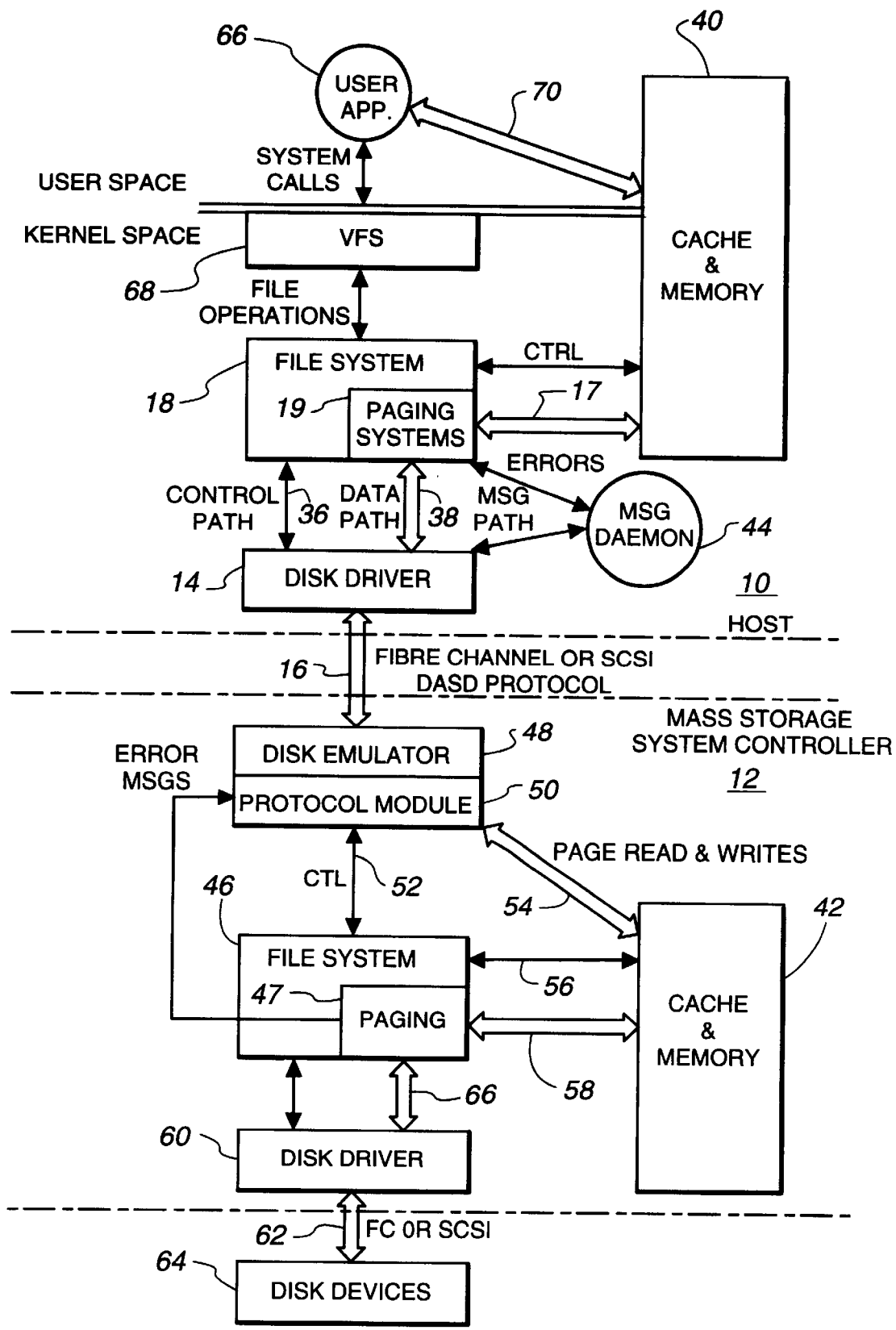
FIG. 1 shows a first preferred embodiment of the invention where the intelligent controller is a mass storage system controller connected to a single host and the peripheral system is a storage system with a plurality of disk drive devices.

FIG. 1 illustrates the system architecture of a host system 10 and an intelligent controller, such as a mass storage system controller (MSSC) 12, according to a first preferred embodiment of the invention. The host system is connected to the mass storage system controller through a conventional disk driver 14 across a SCSI channel or fibre channel 16. MSSC 12 is a computing system and is implemented as a personal computer or workstation computer, such as those based on any of the INTEL-compatible processor designs, or various other processor designs. Intelligent controller or MSSC 12 may also be implemented as a computing system board having a processor and memory and with the board mounted in the frame of a host computer. Alternatively, MSSC 12 may be mounted separately as a standalone computer located remotely from the host. Host 10 might be a large standalone computing system, or a network of host stations all sharing the MSSC 12. Also, host 10 might be a server station in a network of stations for the distributed processing of information.

Disk driver 14 uses standard commands for raw disk I/O (input/output); the commands are DASD protocol commands designed for a disk device with which the disk driver is designed to work. Also, in the preferred embodiment, the channel is a SCSI channel, Fibre Channel or various other versions of SCSI or Fibre Channel. Other types of channels may be used such as SSA (serial storage architecture) and SCSI on IP (Internet protocol). Of course, the disk driver, in addition to following the DASD protocol for the type of disk device it works with, must also follow the channel protocol over which its commands are being passed. In any case, the disk driver is generating raw disk I/O commands which are being used as a communication link to the mass storage system controller. There are no unusual or unique commands required in the communication between host and mass storage system controller. From the perspective of the host file system 18, disk driver 14 is driving a virtual disk 20 (FIG. 2) with a capacity of several terabytes. The size of the virtual disk is only limited by the ability of the host system to address it.

Figure 2:
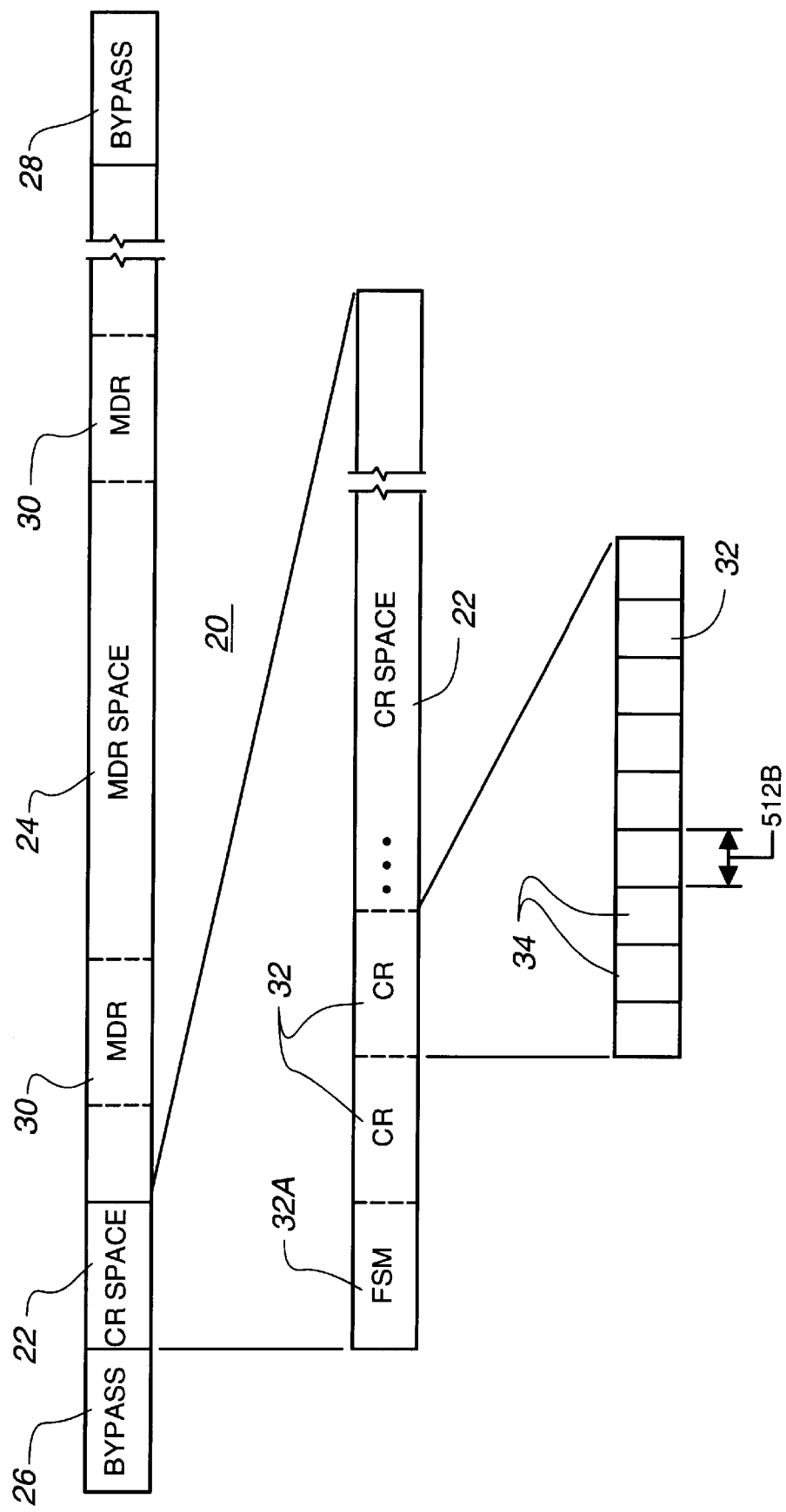
FIG. 2 is a map of virtual storage space 20 of a virtual random access, addressable storage device which is the storage space perceived by the host.

In FIG. 2, the virtual disk 20 is divided into regions with each such region containing a sequential number of blocks in a block-addressable space. A block may be defined to encompass any amount of space; as used herein a block refers to the smallest size of addressable space usually in a random access storage device. Such a space is known as a sector in a disk storage device. Sectors are typically 512 bytes, but they might be other sizes, such as 256 bytes, 1024 bytes, 2048 bytes, etc. depending on the disk device.

The virtual disk 20 in the preferred embodiment is organized into four types of addressable regions—a first Bypass Region 26, a Command Region (CR) 32, a Mapped Data Region (MDR) 30 and a second Bypass Region 28. The first Bypass Region 26, based on the protocol for the virtual disk 20, is defined as being at the beginning of the virtual disk, and the second Bypass Region space 28 is similarly defined as being at the end of the virtual disk. There are "x" number of blocks in a Bypass Region. In the preferred embodiment a Bypass Region is about 1 MB. A Command Region 32 has "m" number of sequential blocks and there are "n" number of Command Regions. The "m" number of sequential blocks for a Command Region is a matter of design choice and depends upon the amount of command information to be conveyed as will be described shortly. Likewise the number "n" of Command Regions is not fixed, but eventually the control protocol of the embodiments of the invention must know where to find Command Regions on the virtual disk. All remaining addressable space on the virtual disk 20 is available to the Mapped Data Regions 30. Each Mapped Data Region (MDR) has "p" number of sequential blocks and there are "q" number of possible Mapped Data Regions. The virtual disk space consumed by all of the Command Regions (m multiplied by n) plus all of the Mapped Data Regions (p multiplied by q) plus both of the Bypass Regions (x multiplied by 2) can not exceed the total virtual disk space.

In the preferred embodiment of the invention, CR space 22 follows the first Bypass Region 26. MDR space 24, i.e., space available to be mapped into MDRs, extends from the end of the CR space 22 to the start of the second Bypass Region space 28. Other locations for CRs and MDRs may be specified, and these regions may even be scattered randomly about the virtual disk. However, as will be described hereinafter, the range of space allocated to CRs and MDRs is used by the processor in the intelligent controller so the location of space for CRs or for MDRs is either predefined or tracked by the processor in the intelligent controller.

The size of a Mapped Data Region is preferably 128 MB (Megabytes), but this size is a matter of design choice for the storage system. Other choices might include 64 MB, 256 MB, 512 MB or other sizes that are not necessarily a power of 2. The choice of size for a Mapped Data Region is made with storage system performance in mind. The MDR size should be large enough to encompass very large files. There is software overhead for mapping and unmapping each MDR, so larger MDRs incur less overhead for large files. However, more, smaller MDRs can be used within a given virtual space and thus may accommodate more files being simultaneously read from and written to. Accordingly, the system designer will select a size for Mapped Data Regions with this trade off in mind.

CR space 22 in the preferred embodiment is the range of addressable space containing all the Command Regions (CRs) 32. In the first preferred embodiment of FIG. 1 and as shown in FIG. 2, each CR has nine sectors 34 with 512 bytes per sector. The first CR is a Finite State Machine CR (FSM CR) 32A. The FSM CR is used to bootstrap communications between the host and the Mass Storage System Controller (MSSC). All remaining CRs 32 in CR space 22 are written-in, or read-out by, disk driver 14 (FIG. 1) as a communication link to pass file processing commands from the host file system 18 to the file processor in mass storage system controller 12.

As discussed earlier, the mass storage system controller is an intelligent controller having a processor. The processor operates as various processing agents depending upon the detected address in the read/write command passed from the host file system through the disk driver to the mass storage system controller. When there is a read command from the host that is addressed to FSM CR 32A, the processor acting as the file system, or control system, at the mass storage system controller initiates a response to identify itself to the host file system that it is a file system controller and not simply a disk drive. The host file system then picks up that it is working with the MSSC file system and not simply a disk drive. The host file system then operates to build disk I/O read/write commands with MSSC file system commands embedded in the read write commands. These read/write commands are addressed to CRs 32 in the range of CR space 22 of the virtual disk 20.

Figure 3:
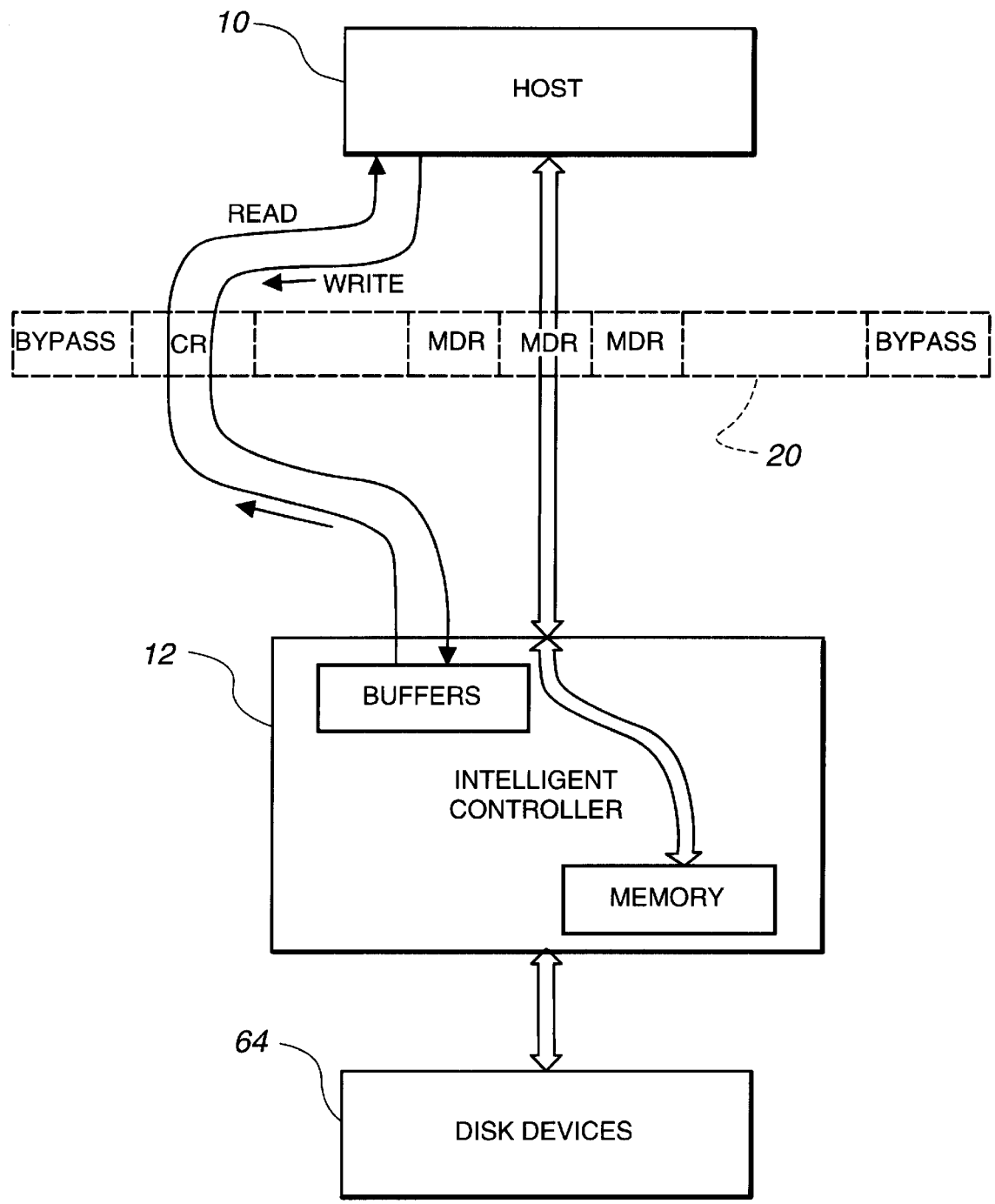
FIG. 3 is a diagram indicating the flow of commands and data between host and intelligent controller through the virtual storage space 20.

The number, size and location of the regions and spaces making up the virtual disk 20 are discussed above for the first preferred embodiment of the invention in FIGS. 1–3. Depending on different uses of the invention, other sizes and locations may be used as a matter of design choice. Also more regions and spaces may be defined. As will be explained hereinafter, organizing a virtual disk to have Command Regions and Mapped Data Regions facilitates the separate flow of commands and data between host and mass storage system controller. Accordingly, commands are used to set up the mass storage system for data transfer operations such as DMA operations, and the DMA operations are used to rapidly transfer data between the mass storage system and the host.

As shown in FIG. 1, there are three paths in host 10 between disk driver 14 and the host file system 18. Control path 36 carries controller commands with control information to be passed to the Mass Storage System Controller (MSSC) 12 for action, or carries controller status returned to the host file system 18. Data path 38 is a high-capacity channel for passing pages of data, as in DMA transfers of data, between MSSC 12 and cache/memory 40 in host 10. The third path through message daemon 44 is for messages, particularly error messages associated with errors in writing or reading of data by file system 46 in MSSC 12.

The Mass Storage System Controller commands and control information on control path 36 are written-in, or read-from, a Command Region (CR) 32 in the CR space 22 (FIG. 2) of the virtual disk 20. These read/write operations for the control path have all of the normal processing overhead associated with raw disk I/O. For example, each write operation is followed by a read operation to return status information about the execution of the command sent to the MSSC file system 46 during the write operation. The controller commands for use by file system 46 of the MSSC 12 are written to CR space 32 for execution by command processors in MSSC. Controller file system commands passed from host file system 18 to the MSSC file system 46 via CR space 32 are, for example: connect/disconnect, filename lookup, mkdir/rmdir (make directory/remove directory), rddir (read directory), map/unmap MDRs, and map/unmap CRs.

For example, a controller map command is used to set up Mapped Data Regions (MDRs) for data transfers. The data paths 17, 38 and 54 are for passing pages of data between memory 40 and memory 42 by way of DMA transfers. Data paths 58 and 66 are for DMA transfers of data between disk devices 64 and memory 42. The capability of performing a DMA transfer is set up by the writing and reading of map controller commands through the Command Regions 32 to define addressable space in an MDR for a file containing the pages. While DMA transfers use hardware to perform the data transfer-operation in this preferred embodiment, alternative data transfer processes that can be used include programmed I/O and coherent memory. Programmed I/O uses a software controlled processor to perform the data transfers. Coherent memory is a process where a write to a first location immediately shows up at another location. In any data transfer process, the transfer is controlled through an MDR in the preferred embodiments of the invention.

In the DMA transfer of pages of data through data path 38, there is no path provided for error messages indicating an error. Error conditions in the execution of controller commands sent to the controller via the Command Regions 32 are returned to the host during the read status operation which immediately follows the command write operation. However, at the operation level of DMA transfers, there is no read status operation. Accordingly, message daemon 44 provides an error message path between the host and the MSSC so that if there is an error, the host will receive back a message indicating there was an error in a read or write data operation.

As explained above, disk driver 14 is talking to MSSC 12 using DASD protocol, raw I/O disk drive read/write commands as if the MSSC was a disk drive. In effect, the flow between disk driver 14 and MSSC 12 is a communication link using DASD protocol. Therefore, the first layer of operations at MSSC 12 is disk emulation. Disk emulator module 48 interfaces with the raw disk I/O commands from disk driver 14 to respond as a disk device to the disk driver. One significant advantage in using the disk driver and DASD protocol as a communication link is that disk emulator module 48 is easily reprogrammed to emulate other disk devices working potentially on other interfaces with the host system. Also, in new computing system designs, disk drivers are among the earliest drivers provided for new systems. Therefore, the mass storage system will be available to the new system by only reprogramming the disk emulator module to work with the new disk driver.

Disk emulator 48 receives from disk driver 14 the DASD protocol communication containing the controller commands and arguments. Together, the controller command and arguments, or control information, are referred to herein as controller command data. Protocol module 50 includes the command processors and function objects called by the logical operations described herein to process controller command data. The controller commands with arguments (controller command data) pass over control path 52 to file system 46. The page reads and writes, as DMA transfers, pass over high capacity data path 54 from/to cache and memory 42. The third path is the error message path controlled by message daemon 44 to read error messages from the paging system 47 if an error occurs. The message daemon path is also used for other communication between host and MSSC. Some examples of additional communications are to invalidate the host data cache for a file or portion of a file or to send a token to the host for reservation of a file record lock or to revoke a file record lock.

Cache and memory 42 contain a cache manager and memory manager. The managers communicate control information over control path 56 to file system 46. Page data flow is over data path 58 between cache and memory 42 and paging system 47. From file system 46 to disk driver 60, the operations are disk reads and writes. These operations from paging system 47 are page reads-and-writes. There are additional file system operations between file system 46 and disk driver 60, such as writing a directory to a disk device. Disk driver 60 provides raw disk I/O operations onto SCSI or fibre channel 62 to one or more disk devices 64 connected to channel 62.

In one preferred embodiment, disk devices 64 includes a RAID system, or a plurality of RAID systems, with the individual RAID systems operating at different RAID levels to most efficiently handle different types of data transfers. In another preferred embodiment of the invention, one disk device 64, attached to the disk driver 60, is another mass storage system controller. In this way, MSSCs might be stacked to form a multi-layered mass storage system.

To illustrate the operation of the host 10 with the MSSC 12, assume that user application 66 in FIG. 1 requests data with a system call to the virtual file system 68. Virtual file system sends a read file operation to file system 18, and file system 18 checks with cache manager in cache and memory 40 to see if the file is in cache. If the cache manager has the file in cache, it returns a pointer to the file system 18, and the file system passes the pointer to the user application 66. User application 66 then retrieves the file from cache over the data path 70. If the file is not in cache, the memory manager in cache and memory 40 generates a paging request. If the file is mapped as an addressable Mapped Data Region and further the pages are in cache and memory 42, the paging system 19 then reads the requested pages from the specified file in memory 42 using a DMA transfer operation. The disk driver 14 and disk emulator 48 set up a DMA data transfer path, and the pages are transferred over data path 54 from the cache and memory 42 in MSSC 12 and over data paths 38 and 17 to memory 40. From memory 40, the user application will have access to the pages of data. If the pages are not in memory 42, memory manager in cache and memory 42 generates a paging request. The paging system 47 performs a DMA transfer of requested pages from disk devices 64 to memory 42. The above operation presumes the requested file has already been mapped as addressable Mapped Data Region (MDR). To illustrate the operations for using Command Regions (CRs) in the CR space of the virtual disk 20 (FIG. 2), and to define addressable MDRs in the virtual disk, reference is now made to FIG. 3.

FIG. 3 illustrates the flow of controller commands with control information and the flow of pages of file data between host 10 and MSSC 12 through virtual disk 20. Virtual disk 20 defines ranges of addressable space and represents communication paths rather than actual disk drive storage. The actual storage of file data and metadata is handled by the file system 46 in the MSSC 12 and is located in the disk devices 64. All that is necessary is that file system 18 in the host and file system 46 in the MSSC knows the address in virtual disk 20 of a stored item and that file system 46 knows the actual storage location of that same stored item corresponding to the address in virtual disk 20.

In FIG. 3, the host communicates a controller command to MSSC by executing a SCSI disk drive write operation (SCSI channel in this preferred embodiment) to write the controller, or MSSC, command data at a Command Region address of the virtual disk and then a SCSI disk drive read operation to read the controller, or MSSC, status data. The controller command data is the controller command for the mass storage system controller plus arguments and any other related data about the controller command to be executed in the processor of MSSC. The controller status data contains the status of the execution of the controller command and the response data resulting from execution of the controller command which was embedded in the SCSI write command. As listed above, the MSSC, or controller, commands are connect/disconnect, filename lookup, mkdir/rmdir, rddir and map/unmap MDR. Connect/disconnect are used at initialization to create a communication link between host and MSSC. Filename lookup, mkdir/rmdir, and rddir are used by the file system in the MSSC to look up files, make and remove directories and read directories. Map and unmap MDR are used to map and unmap files into addressable Mapped Data Regions of addressable space as defined for the virtual disk. Thereafter, file pages for files mapped in an MDR may be transferred rapidly between host and MSSC as pages in DMA transfers.

Figure 4:
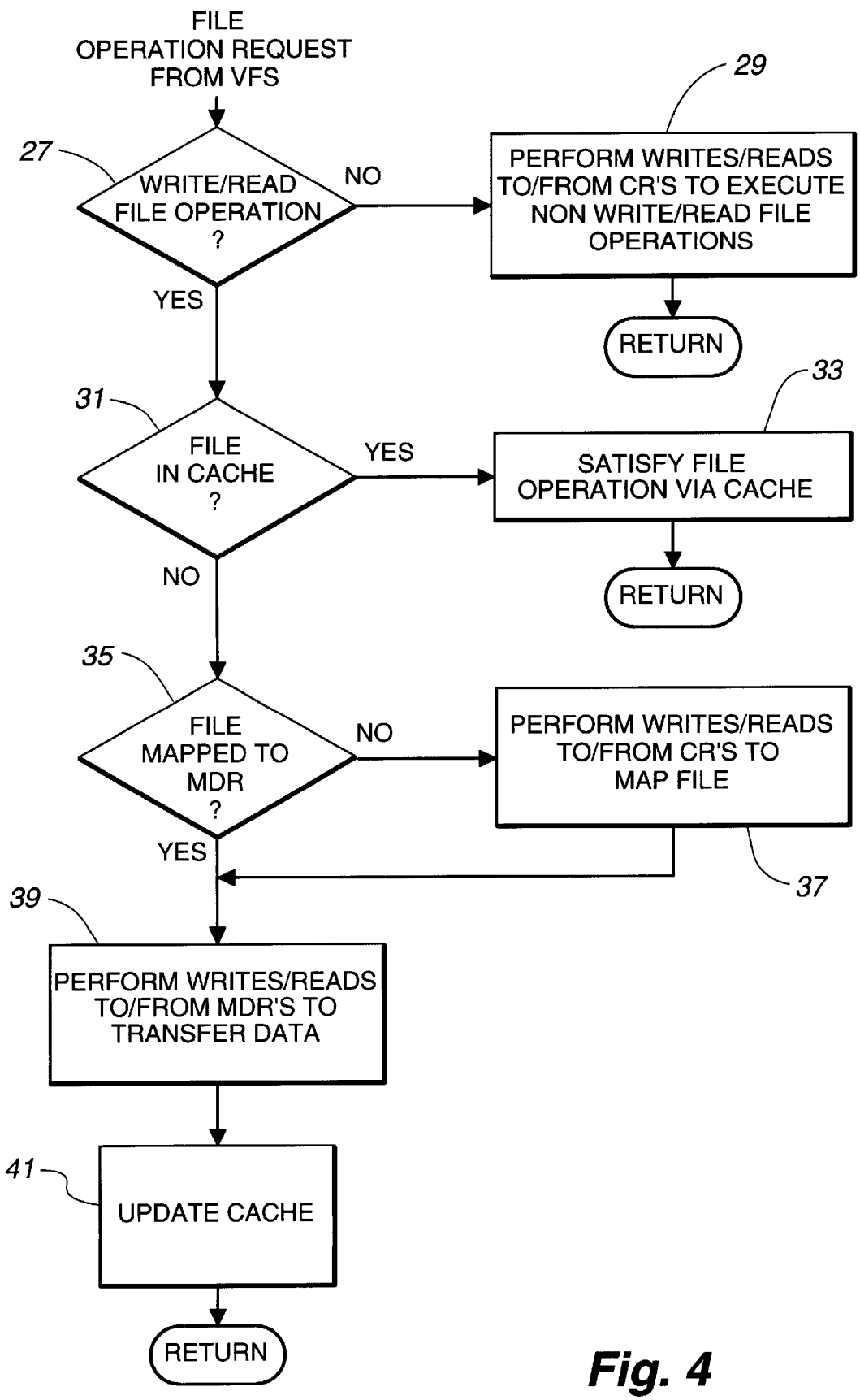
FIG. 4. illustrates the logical operations performed by the host file system in executing a read/write request from the virtual file system 68 in FIG. 1.

FIG. 4 shows the logical operations performed by the host file system 18 in response to a file operation request from the virtual file system 68 in FIG. 1. Decision operation 27 detects whether the requested file operation is a write or read file data operation. If it is not a write or read file operation, the file operation is controlling files rather than writing or reading file data. In this situation the operation flow branches NO to CR write/read operation 29. The CR write/read operation 29 performs the operations for an I/O disk drive operation to write/read controller command data to a Command Region in virtual space 20. As.discussed above, the controller command might be connect/disconnect, filename lookup, mkdir/rmdir, redir or map/unmap. If the requested file operation from the VFS is a write/read operation for file data, the operation flow branches YES to decision operation 31.

Decision operation 31 in FIG. 4 detects whether the file, or portion of a file, identified in the request is in host cache 40. If the file or file portion is in the host cache, operation 33 accesses the file data in cache and satisfies the requested file operation by performing the, operation. If the requested file or file portion is not in cache, the operation flow branches NO to decision operation 35. Operation 35 tests whether the requested file or file portion has been mapped to an MDR. If the requested file or file portion is not mapped to an MDR, the flow branches NO. CR write/read operation 37 performs the write to pass a map command and control information to the intelligent controller to map the file or file portion to an MDR. Operation 37 also reads back to the host file system the controller status data indicating the status of execution of the mapping command and the address in the MDR of the file or file portion. After the mapping operation is complete the operation flow passes to operation 39. Also, if the requested file is mapped to an MDR, the flow branches YES to operation 39.

Figure 6:
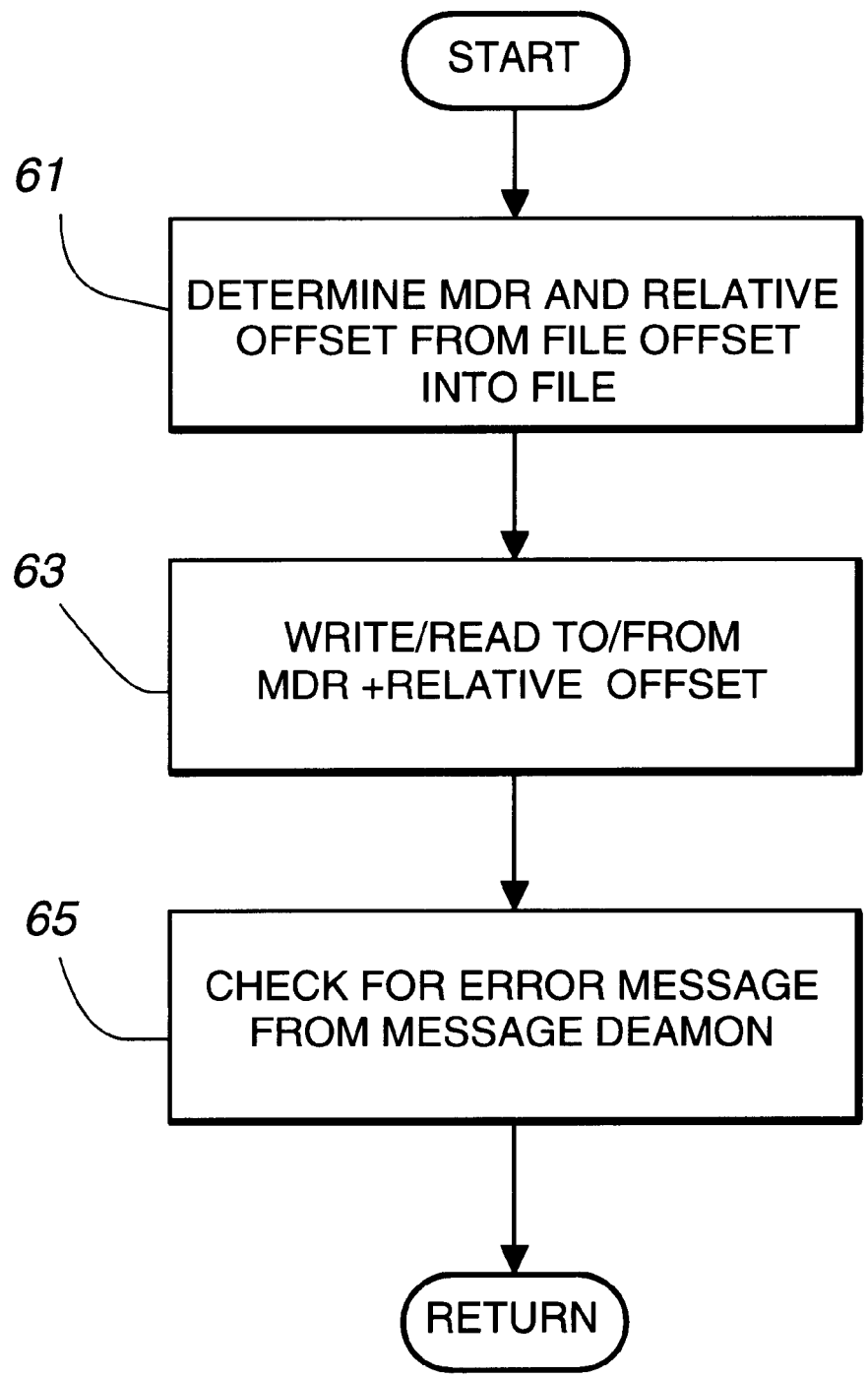
FIG. 6 shows the logical operations performed by the MDR write/read module 39 in FIG. 4 as it write and reads to/from Mapped Data Regions in virtual space 20 to control data transfers.

Operation 39 is an MDR write/read module which performs writes to and reads from MDRs to set up the transfer of data to satisfy the write/read file operation request. This operation 39 is described in detail in FIG. 6. Operation 41 updates the cache 40 upon completion of the file operation request. The operation flow returns to the main, host file system operations.

Figure 5:
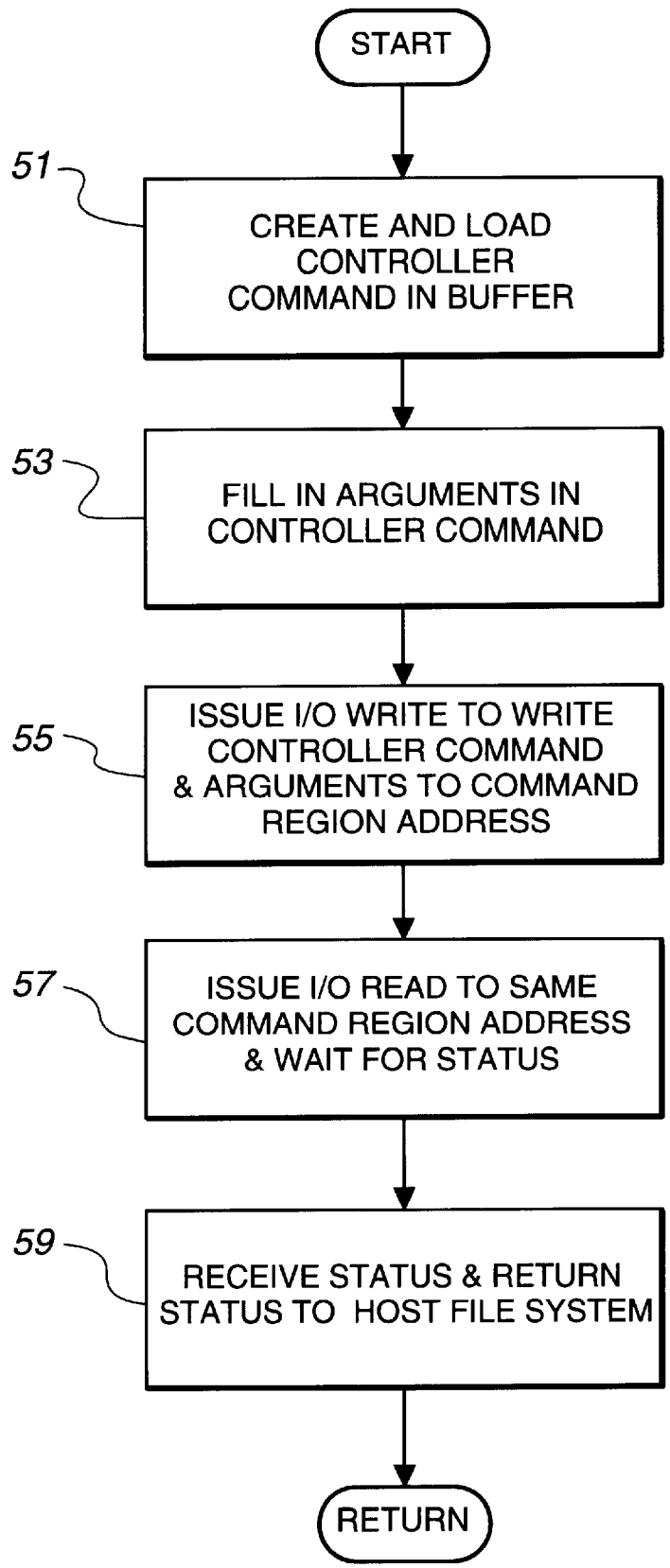
FIG. 5 shows the logical operations performed by the CR write/read operation 29 or module 37 in FIG. 4 as it writes and reads controller command data to/from Command Regions in virtual storage space 20.

FIG. 5 shows the logical operations performed in the host file system by the CR write/read operation 29 or the CR write/read module 37 of FIG. 4. When the CR write/read module is called, operation 51 creates a buffer for the controller command data and loads the controller command in the buffer. Step 53 then fills in the arguments or control information for the controller command and loads that in the buffer with the command. Operation 55 issues the I/O disk drive write command writing the controller command data from the buffer to a command region address in virtual storage disk 20. In effect the host file system has sent a controller command complete with arguments to the intelligent controller, MSSC 12 in FIG. 1.

Operation 57 in FIG. 5 issues a I/O disk drive read command to the same command region address that the CR write/read operation or module just wrote to in operation 55. Operation 57 is waiting for controller status data resulting from the execution of the controller command by the intelligent controller. When the controller status data comes back through the same command region address, operation 59 receives this status information and returns it to the host file system.

To map a file to an MDR in the first preferred embodiment of FIG. 1, the host file system 18 sends an I/O disk drive write to MSSC 12 as follows: WRITE <ADDRESS (CR)> <MAP <FILEHANDLE, FILEOFFSET>>. The I/O disk drive command is WRITE and the ADDRESS (CR) is a Command Region address in virtual disk 20. MAP is the controller command, and FILEHANDLE, FILEOFFSET are the arguments or control information that go with the MAP command. Because the address is in the range of Command Regions in the virtual disk, MSSC 12 will know it is being passed a controller command to be executed by it's processor. MSSC sets up a buffer to receive the command and then its command processing agent executes the MAP command, as will be described in more detail hereinafter. In executing the MAP command, the MSSC will define an addressable MDR for the requested file or file portion. The addressable MDR location is defined by a LBA (logical block address), which is the start address for the MDR. In the preferred embodiment the address for the start of a file or file portion is set by the MSSC to the logical block address, that is at the beginning of the MDR. In an alternative embodiment, if multiple files or file portions were being mapped into the same MDR, then the MSSC would specify an MDROFFSET in addition to the LBA. The MDROFFSET identifies the location of the file or file portion in the MDR. The location is determined by adding the MDROFFSET to the MDR's LBA.

As discussed above for operations 55 and 57, the I/O disk drive write operation from the host to a Command Region is always followed by an I/O disk drive read operation from the host to the same Command Region to read MSSC status data. In this case, the I/O read operation from host 10 is as follows: READ <ADDRESS (CR)> <STATUS, LBA, LENGTH>. READ is the I/O disk drive command. The ADDRESS (CR) is the same Command Region address as for the above WRITE command. In this example, STATUS is the status of execution of the MAP command by the MSSC. LBA and LENGTH are arguments or control information passed back to the host file system 18. LBA is the logical block address for the MDR for the file; LENGTH is the size of the MDR. In the preferred embodiment the LENGTH is 128 MB. Other lengths may be programmed into the MSSC. Also in an alternative embodiment where more than one file or file portion is mapped into the same MDR, an MDROFFSET parameter must be added to the arguments or parameters passed back through the same Command Region address. Accordingly in the alternative embodiment where multiple files or file portions are in the same MDR, the I/O read operation is as follows: READ <ADDRESS(CR)> <STATUS, LBA, MDROFFSET, LENGTH>.

Since the I/O write and the I/O read for a controller map command are addressed to the same CR address, the host system, when it reads back the LBA for the MDR, will know the file or file portion assigned to the MDR. If the mapping operation is successful, both the host and the MSSC now have an address in the MDR for the requested file. The requested write/read file operation in FIG. 4 may now be initiated by MDR write/read module 39. While this referred embodiment maps one file or file portion for each MDR, more than one file could be mapped into an MDR in the above alternative embodiment where an MDROFFSET is used. Also, multiple file portions of a single file might each be mapped into a different MDR. The MSSC has the flexibility to map in any of these ways or in other ways selected for optimum system performance.

After operation 37 is performed to map a requested file to an MDR, or when the requested read/write file operation from the VFS 68 (FIG. 1) is for a file already mapped in an MDR, MDR write/read module 39 is called. MDR write/read module 39 of FIG. 4 is shown in detail in FIG. 6. Operation 61 in FIG. 6 determines the Mapped Data Region from FILEOFFSET, the offset of the requested file portion in the file of the write/read file operation. The file operation is most often requesting an operation on a portion of a file rather than an entire file. The offset into the requested file portion is specified in the file operation. This is used by operation 61 to calculate the address location of the same portion as mapped within the MDR. Operation 61 first selects based upon the FILEOFFSET for the requested portion which MDR contains addressable space mapped to the requested file portion. Then operation 61 subtracts the FILEOFFSET corresponding to the start of the file, or file portion, at the Logical Block Address (LBA) of the MDR from the FILEOFFSET for the requested file portion. The difference is the relative offset of the requested file portion from the LBA of the MDR. Operation 63 then issues the I/O disk drive write/read command to perform the write or read file operation requested. The address of the i/O disk drive write/read command is the LBA of the selected MDR plus the relative offset for the requested portion of the file calculated in operation 61.

The following two examples will illustrate operations 61 and 63. In the simplest and most usual case, the file containing the requested file portion is small enough to fit within a single Mapped Data Region. Also, the start of the file is at the LBA of the MDR for the file. For example, the file, containing the requested file portion, is 100,000 blocks long, fits within the 128 MB addressable space of an MDR starting at LBA=XXX0000100 and the first block of the file is mapped to that LBA. Further, in this first example, the FILEOFFSET to the start of the requested file portion within the file is 60,000. Then operation 61 determines from the FILEOFFSET that the requested file portion falls within one MDR containing the entire file. Operation 61 also determines the relative offset by subtracting the FILEOFFSET for start of file at the LBA of the MDR, which is zero, from the FILEOFFSET for the requested file portion, which FILEOFFSET=60,000. Therefore, operation 61 determines a relative offset of 60,000. Next, operation 63 determines the address for the write/read operation by adding the LBA and the relative offset. In other words, the address in the virtual space 20 for requested file portion is XXX0060100.

In a second example, which is more complicated it is assumed that for whatever reason, size of file, performance or otherwise, the intelligent controller mapped the file containing the requested portion into two MDRs. In this example, we will assume the file extends from block "0" to 180,000. Further, we will assume that from block "0" to block 99,999 the file is unmapped into MDR#1 and that block 100,000 to block 180,000 is mapped into MDR#2. Note that the MDRs are not actually numbered in the preferred embodiments of the invention, but are numbered in this example to simplify the description of the operations. Also, note that each of these MDRs can be anywhere in the virtual space and are not required to be in sequence or order. Now, in this example assume the requested file portion has a FILEOFFSET=132,000 and MDR#2 has an LBA= XXX8000010. Accordingly, operation 61 first determines from the FILEOFFSET that the requested file portion is in MDR#2, i.e. 132,000>99,999. Next operation 61 determines the relative offset into MDR#2 by subtracting the FILEOFFSET to the beginning of MDR#2 from the FILEOFFSET of the requested file portion, i.e. relative offset=132,000–100,000=32,000. Now operation 63 generates the write/read address in virtual storage space for the requested file portion by adding the relative offset to the LBA for MDR#2, i.e. address=XXX8000010+32000=XXX8032010.

After operation 63 issues the write or read command addressed to the LBA of the selected MDR plus the relative offset, operation 65 waits for the data transfer operation to complete, and checks for error messages from the message daemon 44. If an error occurred during the data transfer, operation 65 gets the error message passed by message daemon 44 to host file system 18. In the data transfer operations, only data is flowing over the channel between MSSC and host. After MDR write/read operations, errors are routed through a Command Region by message daemon 44 in the host. Message daemon 44 writes a request for error messages through a CR and then reads the result of the request (error message or no errors) through the same CR.

Figure 7:
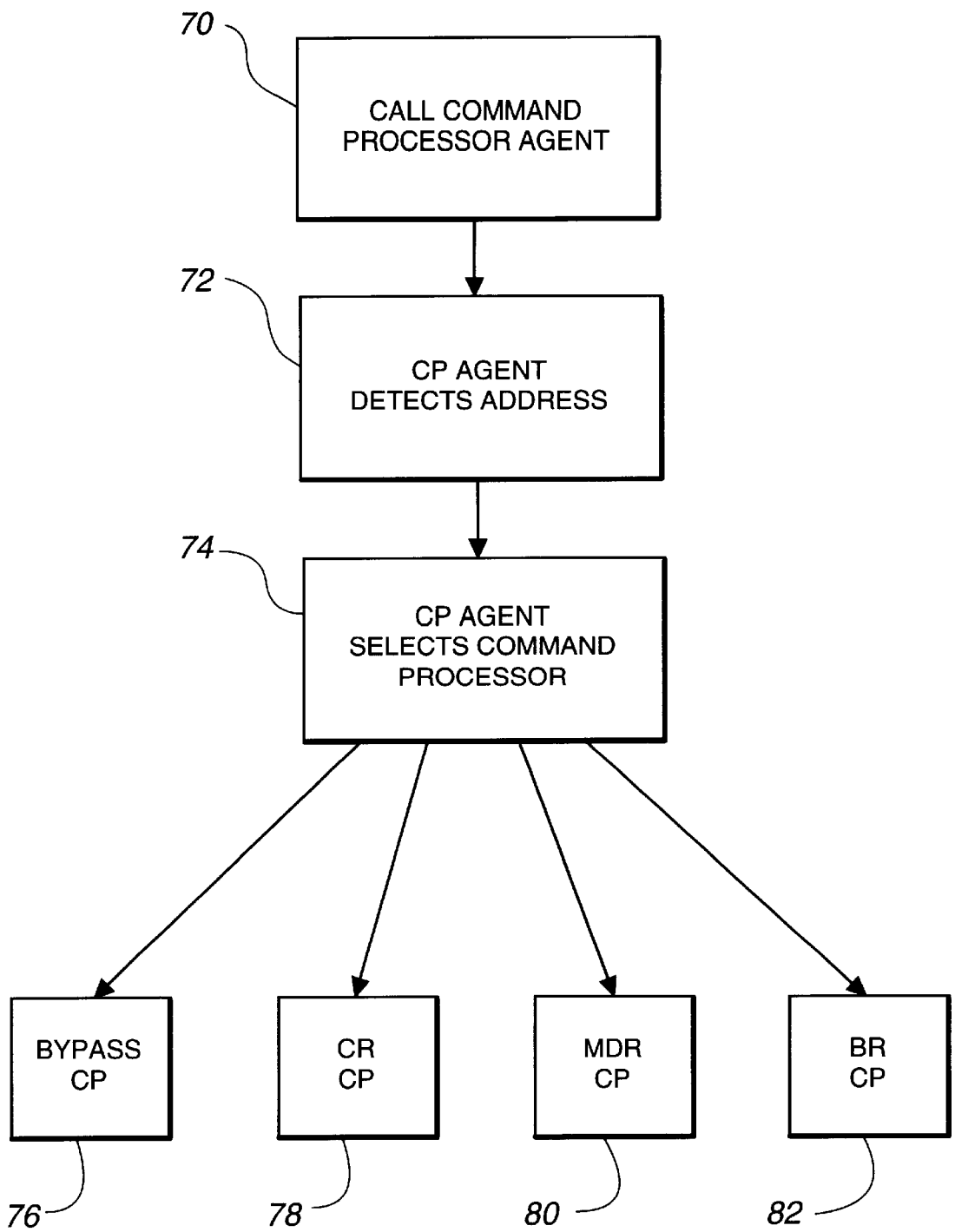
FIG. 7 illustrates the division of processing operations at the processor in the intelligent controller based on detection of the I/O command address to the virtual storage space 20.

On the intelligent controller or MSSC side of the interface, FIG. 7 illustrates logical operations performed by the disk emulator 48 and the protocol module 50 of FIG. 1 in responding to the raw I/O disk drive commands from disk driver 14 in the host. As described above, the task of the disk emulator module 48 is to respond to disk driver 14 as if the MSSC 12 were a disk device. The protocol module provides the command processor to process the contents of the I/O write/read command from disk driver 14.

In FIG. 7, operation 70 calls a command processor agent. In the command processor agent, operation 72 detects the virtual disk address received with the raw I/O disk drive command. Based on the PITL (Port ID, Initiator ID or address, Target ID or address and Logical Unit Number) the agent in operation 74 selects a Bypass command processor 76, a Command Region command processor 78, an MDR command processor 80 or a boot region command processor 82 to process the contents of the Raw I/O disk drive command. The several terabyte address space described in FIG. 2 is available in its entirety to each unique PITL. This feature provides the ability to map millions of regions if so desired. Host ID 7 on Port 1, talking to the MSSC as Target ID 5, LUN 0 can have different mappings than Host ID 7 on Port 2 talking to the MSSC as Target ID 5, LUN 0. The host has two full sets of LBA space that it can use as desired. If it wants more mappings, it can access the MSSC via yet another PITL combination. Another feature of the command processor agent operation is that two or more combinations of PITLs can have the same mappings. This allows two or more ports to be used as a wider data pipe between host and MSSC. The host can send requests and get response from either port as the host desires. The host may even initiate a command on one port and read the status data from the other port. This feature allows dynamic load balancing of host or mass storage device adapters. It also allows transparent failover, i.e. if one path dies, all work can be routed through the other path with no user intervention.

The Bypass Region command processing operations 76 are mapped just like MDRs to unnamed files on the MSSC.

This is done specifically so that hosts which think the MSSC is a true disk drive may write to these regions and read back what they wrote. Many hosts write labels on all disk devices, and some require this writing of labels to work in order for the disk driver to work at all with the disk device. The Bypass Regions in FIG. 2 need not be at the beginning and end of virtual disk space. Their location depends on the host operating system.

The Command Region command processing operations 78 and the Mapped Data Region command processing operations 80 will be described hereinafter with reference to FIG. 8 and FIG. 9, respectively. The boot region command processing operations 82 are used to handle all reads from and writes to areas of the virtual space 20 which are not handled by other command processors. It responds to write operations by accepting the data, doing nothing with it, and returning success. It responds to read operations by presenting one or more fixed data patterns to the host. It fills the holes in the presentation of a virtual disk to the host, so that a host may do arbitrary writes or reads to or from the disk and get an approximation of the appropriate response.

Figure 8:
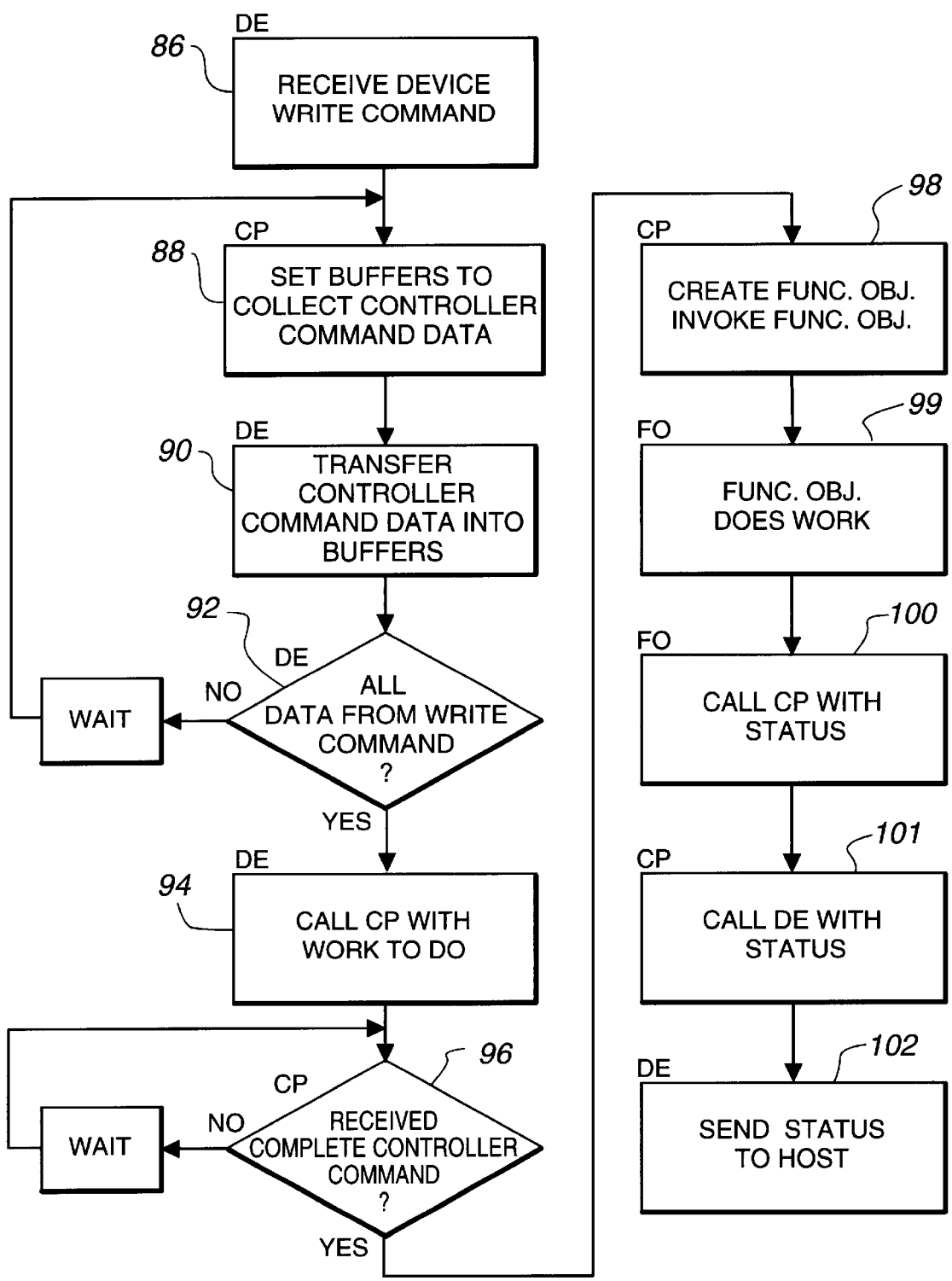
FIG. 8 illustrates the logical operations performed by the intelligent controller in processing commands passed from the host in a disk-drive write command.

In FIG. 8, the logical operations for processing an I/O disk drive write command, which is addressed to a Command Region in the virtual disk and contains controller command data, begins with step 86. In step 86, the disk emulator receives the I/O command, and the disk emulator calls the CR command processor 78 (FIG. 7). The protocol module shown with the disk emulator in FIG. 1 represents the command processors and function objects called in the logical operations of FIG. 8. The content of the I/O write command is the controller command data, i.e. controller command and arguments or control information, as described above for FIG. 3. Operation 88 in the CR command processor then sets up and identifies a buffer in the MSSC 12 to collect the controller command data. Operation 90 in the disk emulator transfers the controller command data into the buffer set up in operation 88. Decision operation 92 in the disk emulator detects whether all the data contained in the write command for the controller command has been collected. If not, the operation flow branches back through a wait operation to identify buffers and collects more data in operations 88 and 90, respectively. If all data in the write command has been collected, operation flow branches YES from decision operation 90 to call module 94.

Call module 94 in the disk emulator calls the CR command processor with controller command data collected thus far in operations 88 and 90. Decision operation 96 in the command processor tests to detect that the controller command data has been completely received. It is possible that more than one I/O write command may be necessary to pass all of the controller command data to the intelligent controller. Accordingly, if the Command Region command processor detects that it does not yet have all the controller command data, the operation flow branches NO from decision operation 96 to wait step 97. When decision operation 96 detects the controller command data has been completely received, the operation flow branches YES to operation 98.

Operation 98 in the CR command processor creates a function object to do the work of the controller command and invokes that function object. In operation 99, the function object does the work as, for example, mapping an MDR for a file. Operation 100 in the function object calls the CR command processor with the controller status data, i.e. status of the work, which is the execution of the controller command (successful or failed), and the parameters or control information resulting from the work. Operation 101 in the CR command processor calls the disk emulator module and provides it the controller status data. Finally, operation 102 in the disk emulator returns controller status data to the host. The host reads the controller status data from the same Command Region addressed during the I/O write command.

Figure 9:
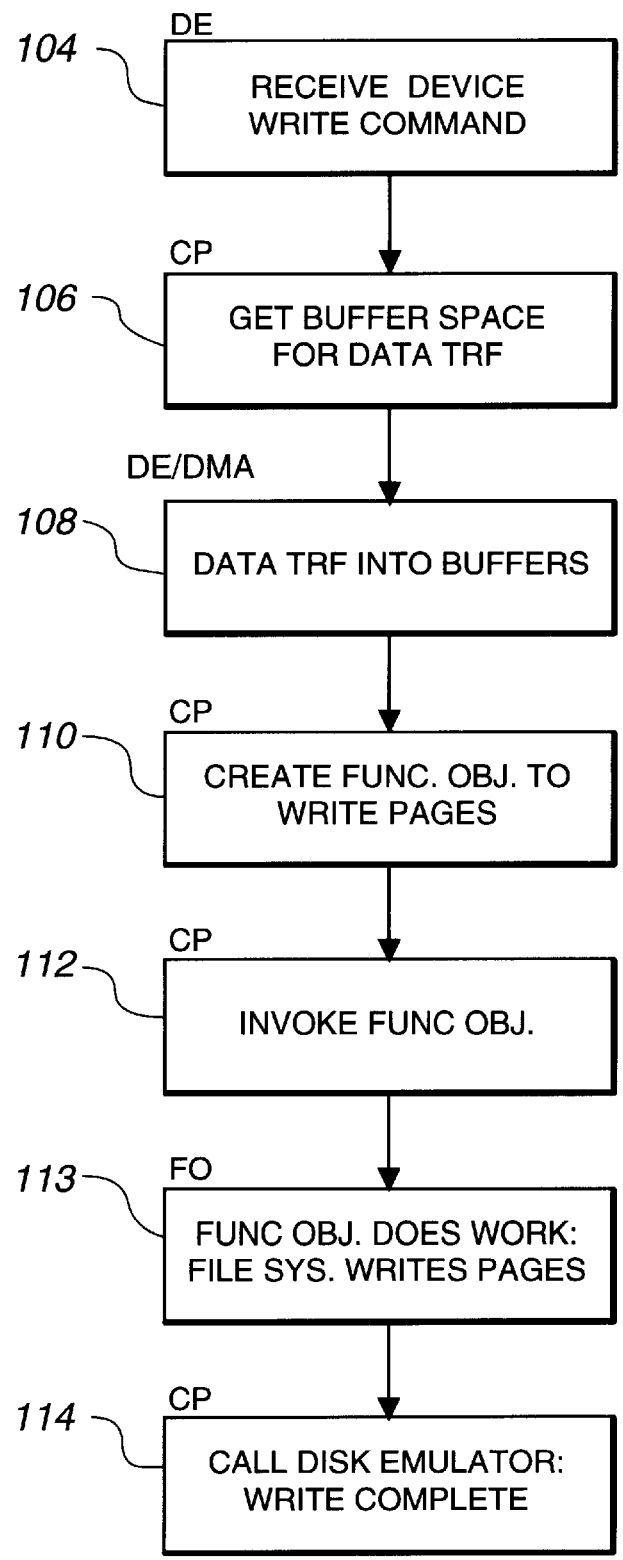
FIG. 9 illustrates the logical intelligent controller in processing a write file command to write data to the storage system in FIG. 1.

In FIG. 9, the operations performed to accomplish a data transfer resulting from a read/write command to an address in a MDR in the virtual storage space are illustrated. In operation 104, the disk emulator receives an I/O disk drive write command with an address within a MDR. The MDR command processor is called by the disk emulator based on the address being within a MDR. Operation 106 in the command processor gets buffer space sufficient for the data transfer about to occur. A DMA transfer operation 108 then transfers pages of file data from the host to the buffers in the controller 12. The buffers, in this case, are implemented as memory space in memory 42. The MDR command processor in operation 110 then creates a function object to write pages using the file system 46 in the controller such as MSSC 12. Operation 112 in the MDR command processor invokes the function object, and the function object works with the controller file system 46 in operation 113 to write pages to a disk device. After the write page operations are complete, the MDR command processor receives a call from the function object in operation 114, and the MDR command processor calls disk emulator module 48 with a write complete. The I/O write complete status is then passed back to the host.

Figure 10:
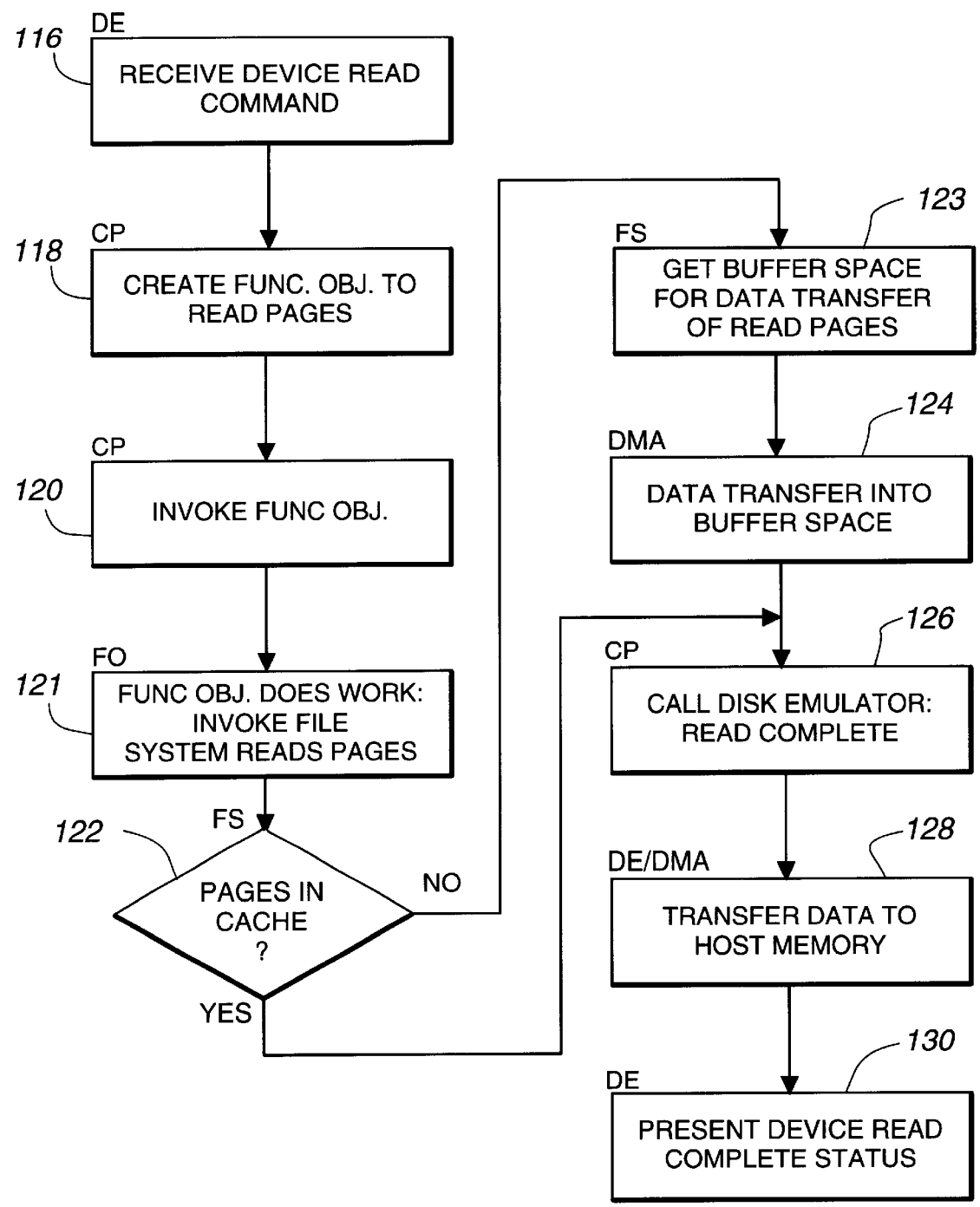
FIG. 10 illustrates the logical operations performed by the intelligent controller in processing a read file command to read data from the storage system in FIG. 1.

A data read operation through an MDR is illustrated in FIG. 10. In operation 116, the disk emulator receives the I/O disk drive read command with the address within a MDR. Based on the address being within a MDR, the disk emulator calls the MDR command processor. Operation 118 in the MDR command processor creates a function object to read pages using the file system 46 in the controller. Operation 120 in the command processor invokes the function object to do the work. In operation 121, the function object invokes the controller file system 46 (FIG. 1) to read the pages. As the first step in the paging operation, decision operation 122 detects if the pages of requested data are in cache/memory 42 (FIG. 1). If the pages are not in cache, the operation flow branches NO from decision operation 122 to operation 123. Operation 123 in the file system in the controller gets buffer space for the transfer of data from the disk device. Then, a DMA transfer operation 124 in the file system moves pages from disk device 64 to the buffers (memory 42) set up in operation 123. As is well known, the DMA transfer operation is hardware controlled and does not involve the file processor in the intelligent controller. After the DMA operation is complete, operation 126 in the command processor calls the disk emulator to indicate the read operation in the intelligent controller is complete, i.e. the pages of the requested file are in cache/memory 42 of the controller. The disk emulator in operation 128 sets up a DMA transfer from controller memory 42 to the host memory 40 (FIG. 1). After the DMA transfer hardware is setup, operation 128 performs the DMA transfer of the data to the host memory. In the example of a SCSI channel, the DMA data transfer is performed by a SCSI chip in the intelligent controller working across the SCSI channel to a SCSI chip in the host. These chips handle the direct transfer of data from memory 42 in the controller to memory 40 in the host without intervention by a processor. Finally in operation 130, the disk emulator presents I/O disk drive read complete status to the host.

Figure 11:
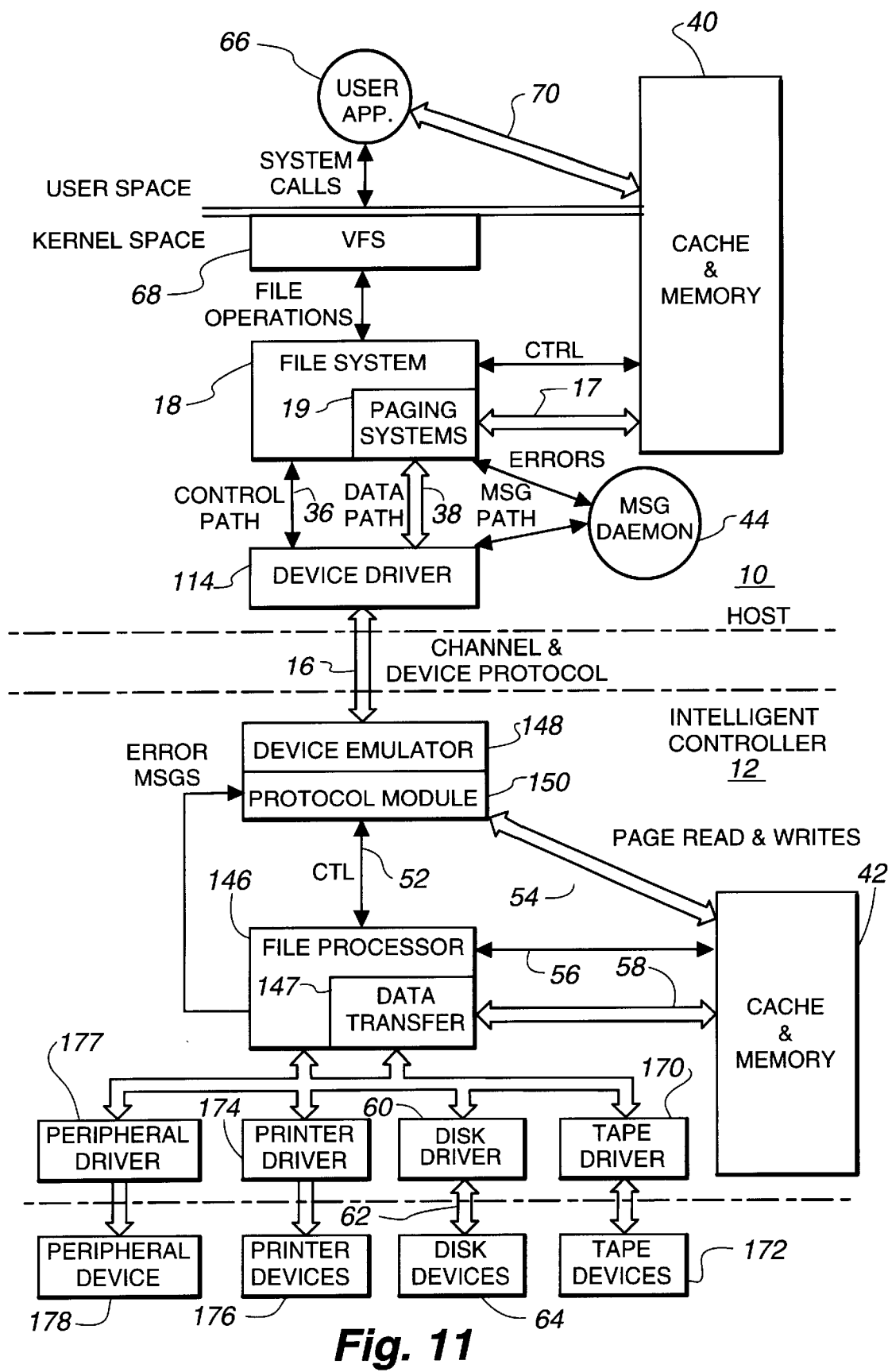
FIG. 11 shows another preferred embodiment of the invention where virtual storage device is any device with addressable space such as a disk device, memory, etc.

In another preferred embodiment of the invention shown in FIG. 11, the intelligent controller 12 interfaces to the host 10 through any device driver 114 and matching device emulator 148. Device driver 114 may be of any type so long as the type of device has addressable storage space. The device emulator 148 emulates the same type of device as device driver 114 so that, as viewed from the host, the device driver 114 is driving into an addressable virtual storage space. Any type of storage device might be used, i.e. emulated, so long as it's space is addressable. Some well-known types of such devices are disk drives, rotating drum devices, memory devices, re-writeable optical disk or optical memory devices, etc. Of course, one skilled in the art will realize that other types of storage devices may be used. Even linear storage devices such as tape drive devices, which normally are accessed sequentially by record without address, could be used if the records were converted to addressable records. From a functional standpoint, the type of storage device emulated as the virtual storage device is unimportant except that it's space must be addressable. In today's computer system environment disk drive emulation in the first preferred embodiment (FIG. 1) is a good choice because disk drives are common in the market. Further, new disk drive devices when introduced are accompanied by their new disk drivers. Accordingly, a computing system using the intelligent controller may be easily adapted to the new disk drive technology by changing the disk driver in the host and the disk.drive emulator in the intelligent controller.

Protocol module 150 and disk emulator 148 operate in the same manner as discussed above for the first embodiment to direct calls to different command processing agents based on the address in the I/O command from the device driver 148. File processor 146 receives the controller command data (controller command plus arguments) from device emulator 148 through a Command Region in the same manner as discussed above in FIG. 3. File processor 146 processes that controller command as discussed above in reference to FIG. 8.

Data transfers are handled by a data transfer module 147 in the file processor 146. These data transfers flow are controlled through the Mapped Data Regions as discussed above in FIG. 3. File processor 146 processes a write/read I/O command to an MDR in the same manner as discussed above in reference to FIGS. 9 and 10. While the data transfer might be done as a DMA operation, it may also be accomplished in other ways such as a processor controlled data transfer or a coherent memory data transfer.

The embodiment of the invention in FIG. 11 also illustrates that the file operations might be used to access diverse computer peripheral devices. Most operating systems support the notion of"device files," which are accessed by applications as though they are limited-functionality files. Such files, when read or written, forward data from or to physical devices such as printers, tape drives and all other peripheral device types. For example, if a file being written is a tape device file, the data would be directed through tape driver 170 to tape devices 172, such as a tape drive or a tape drive library system. If the file is a printer device file, it would be directed through printer driver 174 to printer devices 176. Similarly, all manner of device file types would be directed through the appropriate peripheral device driver 177 to the appropriate peripheral device 178. These peripheral devices might include communication devices, other storage devices or subsystems such as memory systems, RAID subsystems or even another intelligent controller attached as disk device 64 or other peripheral device 178.

Figure 12:
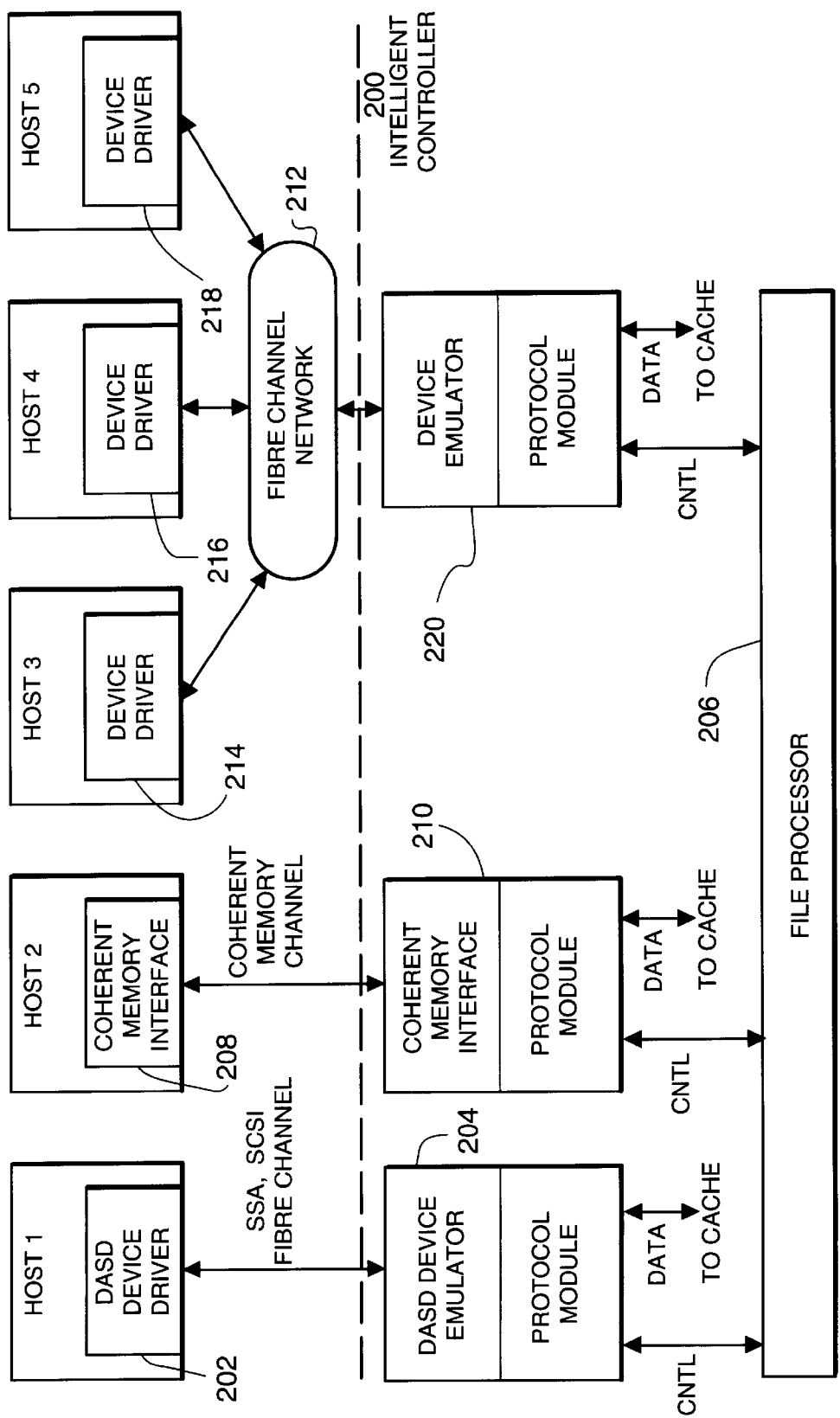
FIG. 12 shows another preferred embodiment of the invention where a plurality of hosts are connected to the intelligent controller through a variety of device drivers and emulators and through a variety of channels.

FIG. 12 shows an intelligent controller supporting a plurality of host systems having different types of device drivers and connected to the controller over different types of channels. Host 1 has a DASD device driver 202 connected over a SCSI, SSA or Fibre channel to a matching DASD device emulator 204 in the intelligent controller 200. For Host 1, the virtual storage device will be a DASD device and the driver 202 and emulator 204 are matched to the DASD and channel type protocol for that DASD device. The I/O write/read commands addressed to a Command Region in the virtual storage device pass controller command data to/from file processor 206. The I/O write/read commands addressed to a Mapped Data Region in the virtual storage device transfer data between Host 1 and the cache in intelligent controller 200.

Host 2 is connected to the same intelligent controller 200 through a coherent memory channel by coherent memory interfaces 208 and 210. In this Host 2 embodiment, the function of a driver to communicate access commands from host to intelligent controller is implemented through a memory interface. Also, the intelligent controller is programmed to provide emulation of a memory as the addressable virtual storage device so that the virtual storage device appears as addressable memory space to Host 2. The memory write/read commands, addressed to a Command Region in the virtual memory space, pass controller command data to/from file processor 206. The memory write/read commands, addressed to a Mapped Data Region in the virtual memory space, transfer data between Host 2 and the cache in intelligent controller 200.

Host 3, Host 4 and Host 5 are connected through fibre channel network 212 to intelligent controller 200. The virtual storage device of whatever type is determined by the device drivers 214, 216 and 218 which all must be of the same type of storage device driver. The drivers must be of the same type because they are each driving to the same device emulator 220 in the intelligent controller and as discussed above the device driver at the host and the device emulator at the intelligent controller must be for the same type of addressable space storage device. The device write/read commands, addressed to a Command Region in the addressable virtual storage space, pass controller command data to/from file processor 206. The device write/read commands, addressed to a Mapped Data Region in the addressable virtual storage space, transfer data between Host 1 and the cache in intelligent controller 200.

It should be apparent to one skilled in the art that many other embodiments of the invention might be described herein with each embodiment built on equivalents in structure and function of the elements of the embodiments described above. It is not possible to describe all possible embodiments without writing an encyclopedia of storage systems and file systems. It should be abundantly clear from the above described embodiments that any type of addressable virtual storage model may be used to provide a path for the controller commands through Command Regions and the transfer of date through the Mapped Data Regions. It should also be very clear that any number of hosts and types of channels may be used to connect the hosts to the intelligent controller.

While the invention has been described with reference to preferred embodiments and several equivalents have been suggested for elements of the invention, as discussed above it will be apparent to one skilled in the art that there are other equivalents in structure and function available today or contemplated for future development that could be substituted for elements of this invention. With such substitution of equivalent elements in mind, we believe the following claims capture the spirit and scope of our invention.

What is claimed is:

1. Mass storage system controller apparatus receiving requests for access to files in a data storage system and managing access to the files in the data storage system, the data storage system having a plurality of storage devices and the requests being addressed to the data storage system as a single virtual storage device having addressable Command Regions allocated to controller commands and addressable Mapped Data Regions allocated for data storage, said apparatus comprising:

a file system to manage access to files in the data storage system, said file system having a processor functioning as a Command Region processor and functioning as a Mapped Data Region processor; and a disk emulator responding as a disk drive device to write/read commands and passing the write/read commands addressed to Command Regions of the virtual storage device to the Command Region processor, the write/read commands addressed to Command Regions containing controller commands for the file system, the Command Region processor responding to controller commands in the write/read commands and processing the controller commands to control files in the data storage system, said disk emulator responding as a disk drive device to write/read commands and passing write/read commands addressed to a Mapped Data Region of the virtual storage device to the Mapped Data Region processor, and the Mapped Data Region processor responding to a write/read command with a Mapped Data Region address and transferring data to or from the data storage system for files mapped to the Mapped Data Region address, wherein the controller commands includes a map command with map arguments for a Mapped Data Region and said Command Region processor responds to the map command and map arguments, and maps files in the data storage system to the Mapped Data Regions.

2. The apparatus of claim 1 wherein the file system comprises a paging system for managing direct memory access transfers of data, and the apparatus further comprises:

buffers set up by the Mapped Data Region processor for direct memory access transfers of data in a file, said paging system performing a direct memory access transfer of data through said buffers for files mapped to the Mapped Data Region address in the write/read command with the Mapped Data Region address.

3. The apparatus of claim 1 and further comprising:

a host computing system, wherein the host computing system generates the request for access to the data storage system.

4. The apparatus of claim 1 wherein the plurality of storage devices comprise a plurality of disk drives and a memory with cache, and when the data requested in a read command with a Mapped Data Region address is in cache, said paging system performs a direct memory access transfer of data from cache.

5. The apparatus of claim 1 wherein the request is from another mass storage system control apparatus and the apparatus of claim 1 is one of the plurality of storage devices in the data storage system managed by said another mass storage system control apparatus.

6. A method providing write/read access to a data storage system through a virtual storage device, said method comprising:

communicating storage system control commands through write/read commands to a Command Region of the virtual storage device, said control commands setting up a Mapped Data Region in the virtual storage device for use in data transfer operations to and from the data storage system;

detecting an address in the write/read command;

selecting a Command Region process if the address is in the Command Region of the virtual storage device;

processing storage system control commands with the Command Region process to map a file in the data storage system to a Mapped Data Region in the virtual storage device; and transferring data to and from the data storage system through write/read commands to the Mapped Data Region of the virtual storage device.

7. The method of claim 6 wherein said transferring data step further comprises:

selecting a Mapped Data Region process if the address detected by said detecting step is in a Mapped Data Region;

processing write/read operations to read or write data in a file mapped to the Mapped Data Region addressed by the write/read command so as to transfer data in the file mapped to the Mapped Data Region from or to the data storage system.

8. The method of claim 6 wherein the virtual storage device is a virtual disk drive, the read/write commands are disk drive write/read commands, and said method further comprises:

emulating a disk drive to handle the disk drive write/read commands whereby the communicating step communicates storage system control commands through the write/read commands and the transferring step transfers files mapped to a Mapped Data Region addressed by a write/read command.

9. The method of claim 8 wherein the requests for access to the data storage system originate at a host computing system.

10. The method of claim 9 wherein a plurality of disk drives are connected to the data storage system, and said data storage system has a memory with cache and said transferring data step further comprises:

direct memory access transfer of files from one or more of the plurality of disk drives from or to the cache and then from or to the cache to the host computing system.

11. The method of claim 7 wherein said processing write/read operations step further comprises:

getting data transfer buffers in the data storage system; and performing a direct memory access transfer from a storage device in the data storage system to or from the data transfer buffers.

12. A peripheral system controller for controlling file operations on a plurality of peripheral devices in response to file operation requests to the peripheral system, said controller comprising:

means for providing an addressable virtual storage device and responding to storage device write/read commands to the peripheral system as if the peripheral system is a virtual storage device;

first means for processing controller commands embedded in the write/read commands received by the controller and addressed to a first region of the virtual storage device;

said first means in response to a controller command for performing file control operations in the peripheral system; and second means in response to a write/read command addressed to the second region of the virtual storage device for transferring data to or form a file in the peripheral system, wherein, said first means in response to a controller map command defines a second region of the virtual storage device and maps a file to the second region, and said second means in response to a write/read command addressed to the second region of the virtual storage device transfers data to or from the file mapped to the second region addressed in the write/read command.

13. The controller apparatus of claim 12, further comprising:

a host computing system for generating the file operation requests for the peripheral system:

means in the host computing system for communicating access commands of a type required by the virtual storage device provided by said providing means.

14. The controller apparatus of claim 12, further comprising:

a plurality of host computing systems, each host computing system generating file operation requests for the peripheral system;

driving means in each host computing system for communicating access commands for the virtual storage device; and wherein said providing means is a plurality of providing means, at least one providing means matching each type of driving means in the plurality of host computing systems.

15. The controller apparatus of claim 12 wherein said providing means comprises a disk drive emulator and the addressable virtual storage device comprises a virtual disk drive.

16. The controller apparatus of claim 12 wherein said providing means comprises a memory emulator and the addressable virtual storage device comprises a virtual memory.

17. The controller apparatus of claim 12, wherein the file operation requests include storage operations and printing operation, and said peripheral system comprises:

means for storing data from a storage operation request; and means for printing data from a printing operation request.

18. An intelligent controller having a processor for performing file control operations and data transfer operations in response to file operation requests to the controller, said intelligent controller comprising:

an emulator for emulating an addressable virtual storage device;

said virtual storage device having a plurality of command regions for virtual storage of controller command data including controller commands and control information;

said processor in the intelligent controller receiving controller commands and control information embedded in virtual storage device write commands and executing the controller commands in accordance with the control information;

said virtual storage device having a plurality of data regions for virtual storage of file data; and said processor in the intelligent controller receiving virtual storage device write/read commands addressed to data regions and transferring data over a data path separate from a control path for the virtual storage device write/read commands.

19. The intelligent controller of claim 18, further comprising:

a protocol module working with said emulator detecting when the virtual storage device write/read command is addressed to a command region and calling said processor to act as a command region processor; and said command region processor executing the controller command in the write/read command addressed to the command region.

20. The intelligent controller of claim 19 wherein the controller command is a map command and said command region processor executes the map command to map the location of a file to a data region in the virtual storage device.

21. The intelligent controller of claim 19 wherein said protocol module works with said emulator for detecting when the virtual storage device write/read command is addressed to a data region and calling said processor to act as a data region processor; and said data region processor in response to the write/read command addressed to the data region transferring data addressed in the data region.

22. The intelligent controller of claim 20 wherein said protocol module works with said emulator for detecting when the virtual storage device write/read command is addressed to a data region and calling said processor to act as a data region processor; and said data region processor in response to the write/read command addressed to the data region transferring data addressed in the data region.

23. In an intelligent controller having a processor, a method for performing file control operations and data transfer operations in response to file operation requests to the controller, said method comprising:

emulating an addressable virtual storage device, said virtual storage device having a plurality of command regions for virtual storage of controller command data including controller commands and control information and having a plurality of data regions for virtual storage of file data;

receiving controller commands and control information embedded in virtual storage device write commands;

executing the controller commands in accordance with the control information;

receiving virtual storage device write/read commands addressed to data regions; and transferring data, requested in the virtual storage device write/read commands addressed to a data region, over a data path separate from a control path for the virtual storage device write/read commands.

24. The method of claim 23 wherein said step of receiving controller commands and control information comprises:

detecting a virtual storage device write command addressed to a command region; and collecting the controller command and control information embedded in the virtual storage device write command addressed to the command region.

25. The method of claim 24 wherein the controller command is a map command and said executing step maps a location of a file to a data region in the virtual storage device.

26. The method of claim 24 further comprising:

detecting when the virtual storage device write/read command is addressed to a data region and calling said step of transferring data.

27. The method of claim 25 further comprising:

detecting when the virtual storage device write/read command is addressed to a data region and calling said step of transferring data.

28. A computer program storage medium readable by a computing system and encoding a computer program including computer executable code for executing a computer process for providing write/read access to a data storage system through a virtual storage device, said computer program storage medium comprising:

code for communicating storage system control commands through write/read commands to a Command Region of the virtual storage device, said control commands setting up a Mapped Data Region in the virtual storage device for use in data transfer operations to and from the data storage system; and code for detecting an address in the write/read command;

code for selecting a Command Region process if the detected address is in the Command Region of the virtual storage device;

code for processing storage system control commands with the Command Region process to map a file in the data storage system to a Mapped Data Region in the virtual storage device; and code for transferring data to and from the data storage system through write/read commands to the Mapped Data Region of the virtual storage device.

29. The computer program storage medium of claim 28 wherein said code for transferring further comprises:

code for selecting a Mapped Data Region process if the detected address is in a Mapped Data Region;

code for processing write/read operations to read or write data in a file mapped to the Mapped Data Region addressed by the write/read command so as to transfer data in the file mapped to the Mapped Data Region from or to the data storage system.

30. The computer program storage medium of claim 29 wherein said code for processing write/read operations further comprises:

code for getting data transfer buffers in the data storage system; and code for performing a direct memory access transfer from a storage device in the data storage system to or from the data transfer buffers.

31. A computer program product for executing a computer process in an intelligent controller for a data storage system, said computer program product being loadable into the intelligent controller and encoding a program of instructions causing the intelligent controller to perform file control operations and data transfer operations in response to file operation requests to the controller, said computer program product comprising:

instructions for emulating an addressable virtual storage device, said virtual storage device having a plurality of command regions for virtual storage of controller command data including controller commands and control information and having a plurality of data regions for virtual storage of file data;

instructions for receiving controller commands and control information embedded in virtual storage device write commands addressed to a command region;

instructions for executing the controller commands in accordance with the control information:

instructions for receiving virtual storage device write/read commands addressed to a data region; and instructions for transferring data, requested in the virtual storage device write/read commands addressed to a data region, over a data path separate from a control path for the virtual storage device write/read commands.

32. The computer program product of claim 31 wherein said instructions for receiving controller commands and control information comprise:

instructions for detecting a virtual storage device write command addressed to a command region; and instructions for collecting the controller command and control information embedded in the virtual storage device write command addressed to the command region.

33. The computer program product of claim 32, wherein the controller command is a map command and said instructions for executing maps a location of a file to a data region in the virtual storage device.

34. The computer program product of claim 32 further comprising:

instructions for detecting when the virtual storage device write/read command is addressed to a data region and calling said instructions for transferring data.

35. The computer program product of claim 33 further comprising:

instructions for detecting when the virtual storage device write/read command is addressed to a data region and calling said instructions for transferring data.

\* \* \* \* \*